United States Patent
Ho et al.

(10) Patent No.: US 7,576,455 B2
(45) Date of Patent: Aug. 18, 2009

(54) HIGH PERFORMANCE FOCUSING ACTUATOR OF A VOICE COIL MOTOR

(75) Inventors: Chi-Hsin Ho, Taichung (TW); Chih-Chien Liu, Taichung (TW)

(73) Assignee: Tricore Corporation, Taichung (TW)

( * ) Notice: Subject to any disclaimer, the term of this patent is extended or adjusted under 35 U.S.C. 154(b) by 446 days.

(21) Appl. No.: 11/503,057

(22) Filed: Aug. 14, 2006

(65) Prior Publication Data

US 2008/0036304 A1   Feb. 14, 2008

(51) Int. Cl.
*H02K 41/00* (2006.01)
(52) U.S. Cl. .................... 310/12; 359/813; 359/814; 359/824; 310/14
(58) Field of Classification Search ............ 310/12–15; 359/813, 814, 823–824, 124, 696
See application file for complete search history.

(56) References Cited

U.S. PATENT DOCUMENTS

| | | | | |
|---|---|---|---|---|
| 5,471,100 A | * | 11/1995 | Sakamoto et al. ............ | 310/12 |
| 7,391,579 B2 | * | 6/2008 | Ho et al. ..................... | 359/696 |
| 7,400,068 B2 | * | 7/2008 | Tseng ......................... | 310/12 |
| 7,400,463 B1 | * | 7/2008 | Wu .............................. | 359/824 |
| 7,457,061 B2 | * | 11/2008 | Sata et al. ................... | 359/824 |
| 2007/0108847 A1 | * | 5/2007 | Chang ......................... | 310/12 |
| 2007/0247539 A1 | * | 10/2007 | Ho et al. ..................... | 348/335 |
| 2008/0231975 A1 | * | 9/2008 | Hou et al. ................... | 359/824 |

* cited by examiner

*Primary Examiner*—Burton Mullins
*Assistant Examiner*—Leda Pham

(57) ABSTRACT

A high performance focusing actuator of a voice coil motor comprises a retaining unit having a plastic retaining frame; a center portion of the plastic retaining frame being a receiving space; two opposite corners of the receiving space being chamfered; an inner side of each chamfered side being formed with a slide portion; and a metal rear cover plate having a shape corresponding to that of the plastic retaining frame; the metal rear cover plate having an open space coaxial with the receiving space of the plastic retaining frame; an outer side of the metal rear cover plate having four outer plates; each of two opposite corners of each outer plate being formed with an inclined guide surface corresponding to the slide portion of the plastic retaining frame; an iron receiving gap being formed between an inclined guide surface and outer plate; and each iron receiving gap receiving a magnet.

8 Claims, 5 Drawing Sheets

US 7,576,455 B2

HIGH PERFORMANCE FOCUSING ACTUATOR OF A VOICE COIL MOTOR

FIELD OF THE INVENTION

The present invention relates to actuators, and particularly to a high performance focusing actuator of a voice coil motor, wherein the structure of the actuator is stable and the magnetic flux loop is perfect so as to have a high efficiency.

BACKGROUND OF THE INVENTION

The prior art focusing actuator of a voice coil motor has a retainer and a lens cylinder movably installed to the retainer. The structure of this prior art actuator has a complicated structure. Thereby the sealing of the structure is not better so that undesired objects, such as dusts, will enter into the structure.

In one improvement structure, the retainer is formed by a plastic retaining frame to enclose a metal structure. The retainer has four magnets as a fixed structure for receiving a movable structure formed by a lens cylinder and coils. A resilient spring is installed between the fixed structure and the movable structure. Then the fixed structure is assembled within a support box. Thus a focusing actuator of a voice coil motor is formed.

However, the above mentioned actuator can resolve the problem in the prior art, but since the retainer is formed by a plastic retaining frame to enclose a metal structure. A periphery of the retainer is an insulated frame. The four magnets are not well connected so that magnetic flux will leak out and thus the magnetic flux circuit can not be well operated.

Moreover, the manufacturing process of the prior art is complicated. The retainer is made by two different materials. It is difficult to combine the two different materials. Thus the stability of the retainer is not good. As a result, the magnetic flux loop is not perfect so as to affect the efficiency of the magnetic flux.

SUMMARY OF THE INVENTION

Accordingly, the primary object of the present invention is to provide a high performance focusing actuator of a voice coil motor, wherein the structure of the actuator is stable and the magnetic flux loop is perfect so as to have a high efficiency.

To achieve above objects, the present invention provides a high performance focusing actuator of a voice coil motor which comprises a retaining unit including a plastic retaining frame; a center portion of the plastic retaining frame being a receiving space; two opposite corners of the receiving space being chamfered; an inner side of each chamfered side being formed with a slide portion; and a metal rear cover plate having a shape corresponding to that of the plastic retaining frame; the metal rear cover plate having an open space which is coaxial with the receiving space of the plastic retaining frame; an outer side of the metal rear cover plate having four outer plates; each of two opposite corners of each outer plate being formed with an inclined guide surface corresponding to the slide portion of the plastic retaining frame; on end of the inclined guide surface being formed with a buckling groove for receiving the buckling portion of the plastic retaining frame; an inner side of each corner of the metal rear cover plate being formed with an inner plate for guiding the slide portion of the plastic retaining frame; an iron receiving gap being formed between the inclined guide surface and outer plate; each iron receiving gap receives a magnet.

The various objects and advantages of the present invention will be more readily understood from the following detailed description when read in conjunction with the appended drawing.

DETAILED DESCRIPTION OF THE INVENTION

Figure 1:
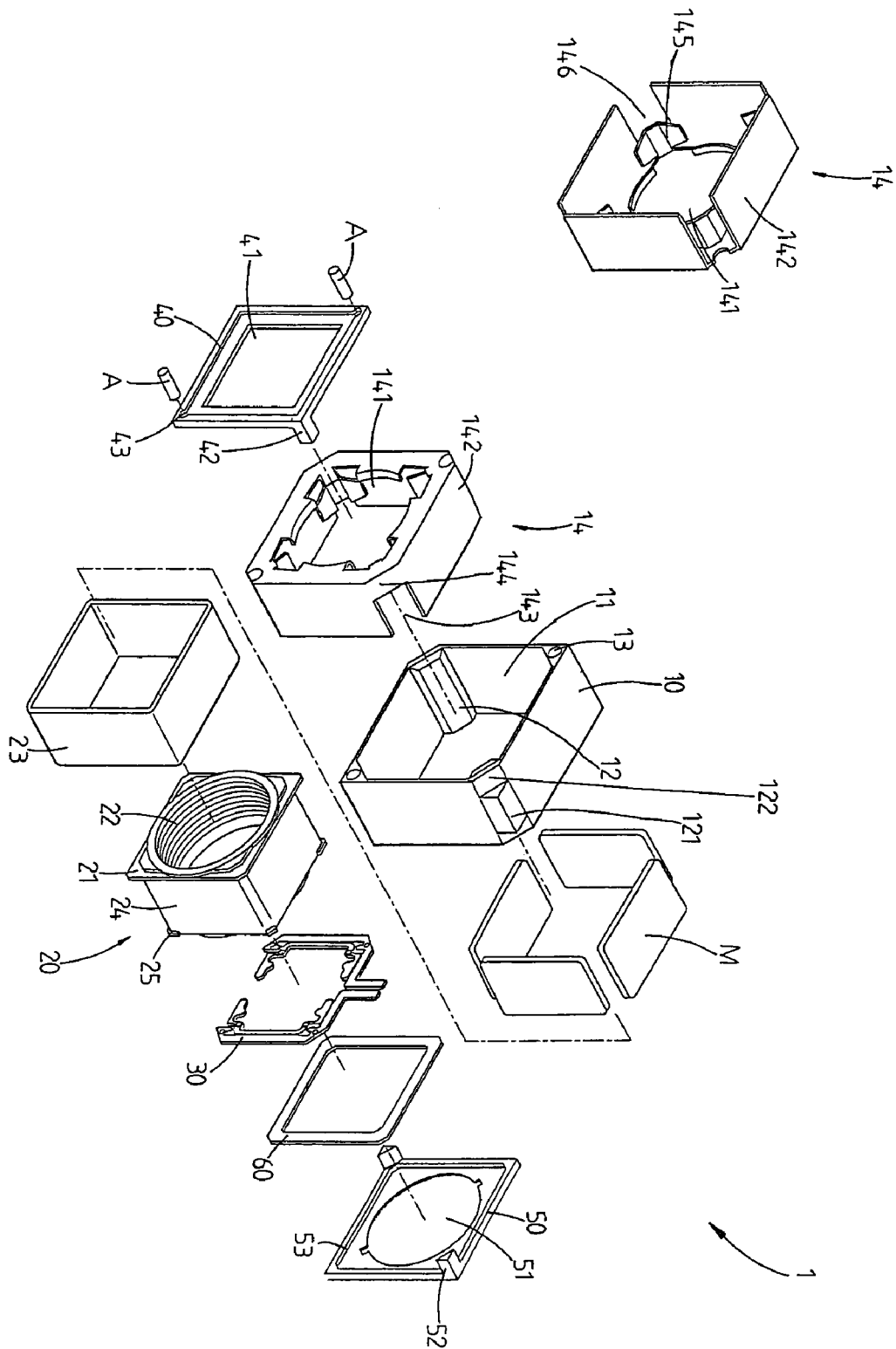
FIG. 1 is the exploded view of the high performance focusing actuator of a voice coil motor of the present invention.
Figure 2:
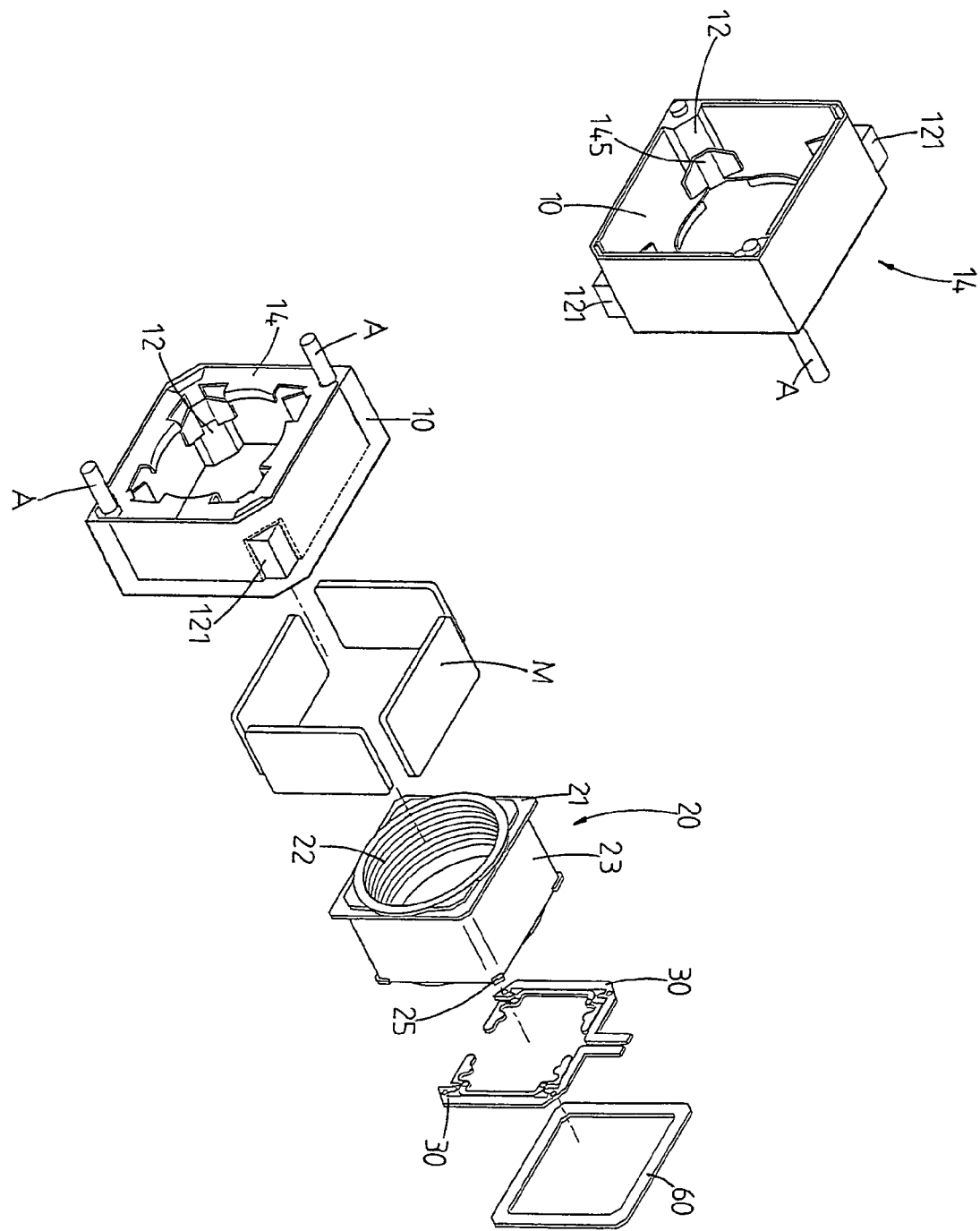
FIG. 2 is a partial schematic view about the high performance focusing actuator of a voice coil motor of the present invention.
Figure 3:
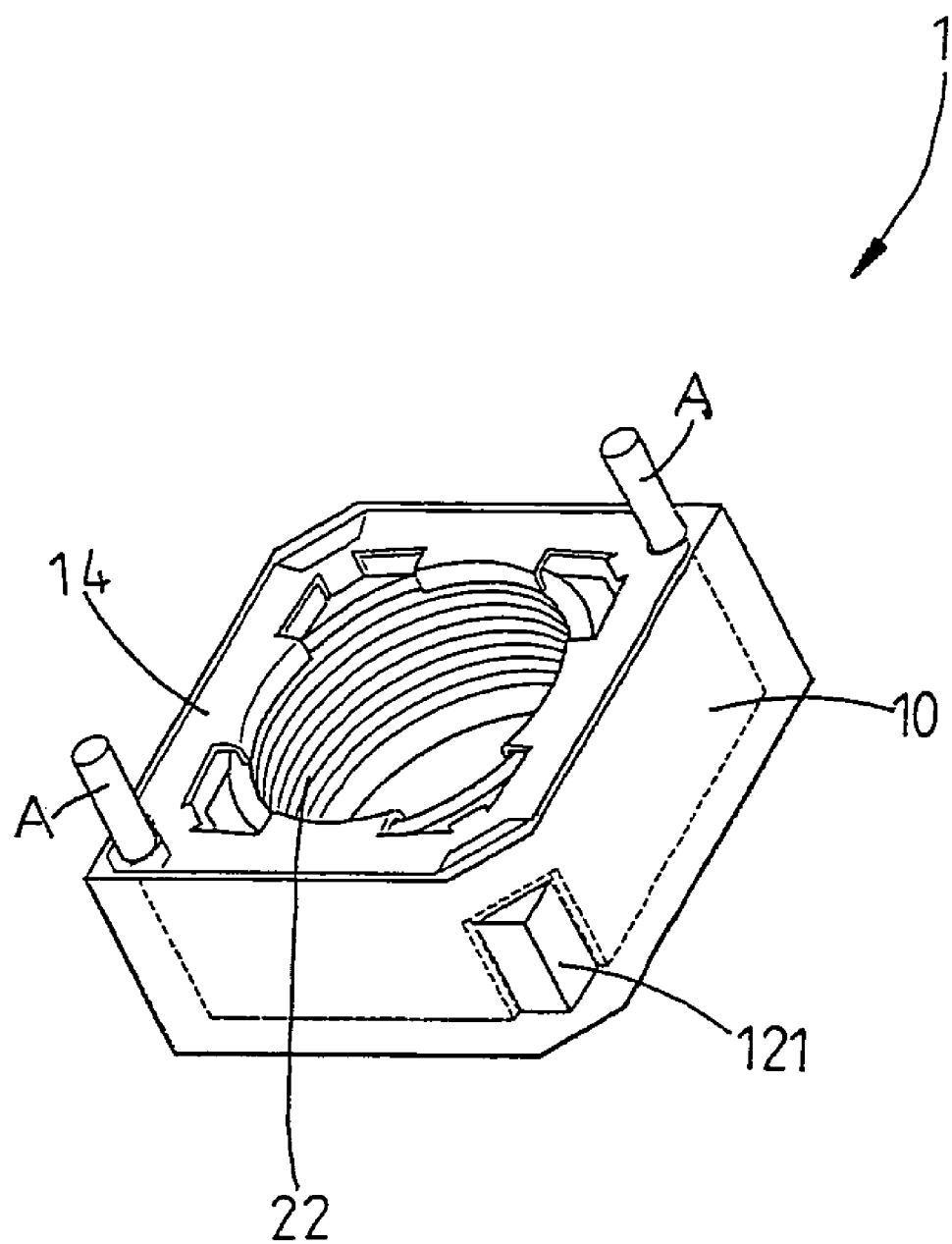
FIG. 3 is a perspective view of the high performance focusing actuator of a voice coil motor of the present invention.
Figure 4:
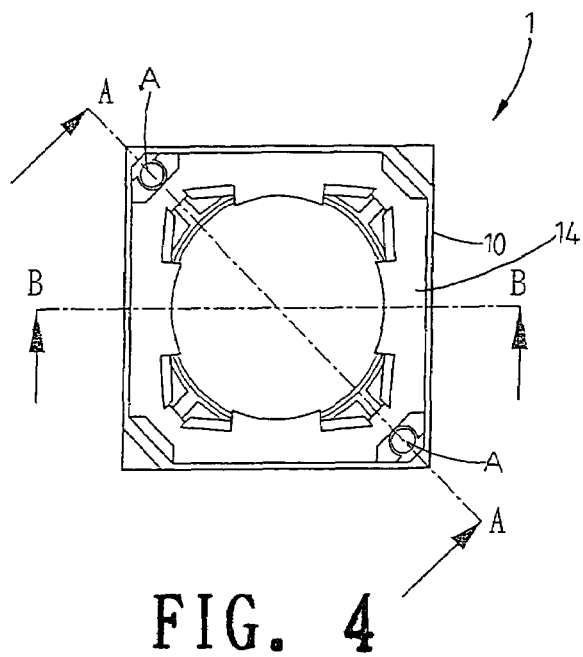
FIG. 4 is an elevational view of the high performance focusing actuator of a voice coil motor of the present invention.
Figure 5:
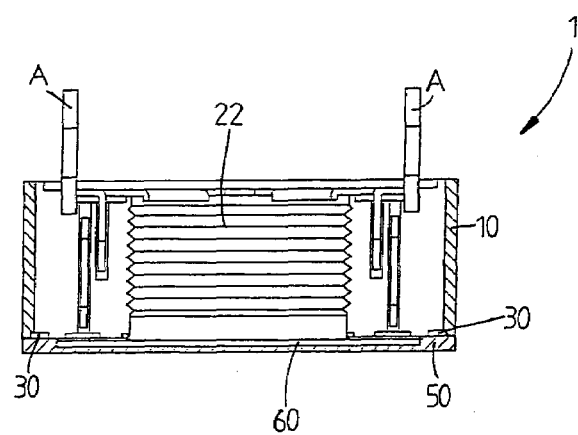
FIG. 5 is a cross sectional view along line A-A of FIG. 4.
Figure 6:
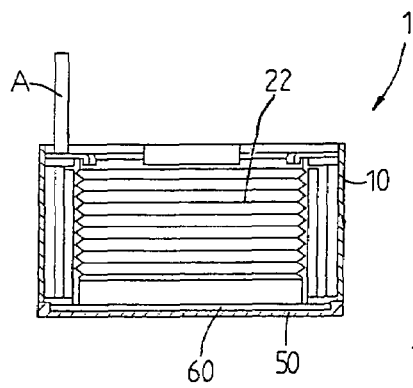
FIG. 6 is a cross sectional view along line B-B of FIG. 4.

In order that those skilled in the art can further understand the present invention, a description will be provided below in details. However, these descriptions and the appended drawings are only used to cause those skilled in the art to understand the objects, features, and characteristics of the present invention, but not to be used to confine the scope and spirit of the present invention defined in the appended claims.

Referring to FIG. 1 to 6, the high performance focusing actuator of a voice coil motor is illustrated. The actuator 1 includes the following elements.

A retaining unit includes a plastic retaining frame 10 which has a hollow rectangular shape. A center portion of the plastic retaining frame 10 is a receiving space 11. Two opposite corners of the receiving space 11 are chamfered. Another two opposite corners of the receiving space 11 are formed with respective connecting hole 13. An inner side of each chamfered side is formed with a slide portion 12. An outer side of the chamfered side is formed with a block 121 so as to form a buckling portion 122.

A metal rear cover plate 14 has a shape corresponding to that of the plastic retaining frame 10. The metal rear cover plate 14 has an open space 141 which is coaxial with the receiving space 11 of the plastic retaining frame 10. An outer side of the metal rear cover plate 14 has four outer plates 142. Each of two opposite corners of each outer plate 142 is formed with an inclined guide surface 144 corresponding to the slide portion 12 of the plastic retaining frame 10. One end of the inclined guide surface 144 is formed with a buckling groove 143 for receiving the buckling portion 122 of the plastic retaining frame 10. An inner side of each corner of the metal rear cover plate 14 is formed with an inner plate 145 for guiding the slide portion 12 of the plastic retaining frame 10. An iron receiving gap 146 is formed between the inclined guide surface 144 and the outer plate 142. Each iron receiving gap 146 receives a magnet M.

A movable unit includes a lens assembly 20 and at least one coil 23 enclosing the lens assembly 20. The lens assembly 20 has a cylinder body 21 at an outer side which is received in the receiving space 11 and a lens cylinder 22 at an interior of the cylinder body 21 for receiving a lens. A cylinder body 21 is formed with a winding portion 24 for receiving the coil 23. Each corner of a lower end of the cylinder body 21 is a resisting portion 25.

Two elastic units 30 are installed at a rear end of the cylinder body 21 and are engaged to the resisting portions 25.

A casing includes a front cover plate 50 and a support plate 40 which are arranged at two ends of the retaining unit. A center of the rectangular support plate 40 is formed with a rectangular through hole 41. A rear end of the cylinder body 21 protrudes from the through hole 41. Each of two opposite corners of the support plate 40 corresponding to the slide portions 12 of the plastic retaining frame 10 is extended with a buckling post 42. The other two opposite corners of the slide portion 12 are formed with two penetrating holes 43 corresponding to the connecting holes 13 of the plastic retaining frame 10. Two pins A pass through the penetrating holes 43 of the support plate 40 and the connecting holes of the plastic retaining frame 10 so as to fix the support plate 40 to the plastic retaining frame 10. A center of the front cover plate 50 is formed with a round through hole 51. Each of two opposite corners of the front cover plate 50 is formed with a buckling post 52. An inner side of the front cover plate 50 is formed with a buckling groove 53. An iron unit 60 is installed between the buckling groove 53 and the elastic unit 30 for sealing the magnet M in the iron receiving gap 146.

The advantages of the actuator 1 of the present invention will be described below.

The present invention is a power saving device. The metal rear cover plate 14 is received in the iron receiving gap 146 of the metal rear cover plate 14. A front end thereof resists against and is sealed by an iron unit 60. An insulated plastic retaining frame 10 encloses the metal rear cover plate 14 so that the short outer plate 142 is fixed and formed as a closed space and thus the magnetic lines emitted from the magnet M in the iron receiving gap 146 are concentrated in the closed space. The magnet M in the iron receiving gap 146 is parallel to the inner plate 145 so as to overcome the problem the magnetic flux linkage. The magnetic flux is concentrated in the sealing space, the efficiency of the actuator 1 being promoted.

Moreover, the present invention can simplify the components. The plastic retaining frame 10 and metal rear cover plate 14 are made individually. They can be formed quickly. No complicated structure is used so that the magnetic flux loop is more complete. Thus the present invention is novel and inventive.

Figure 7:
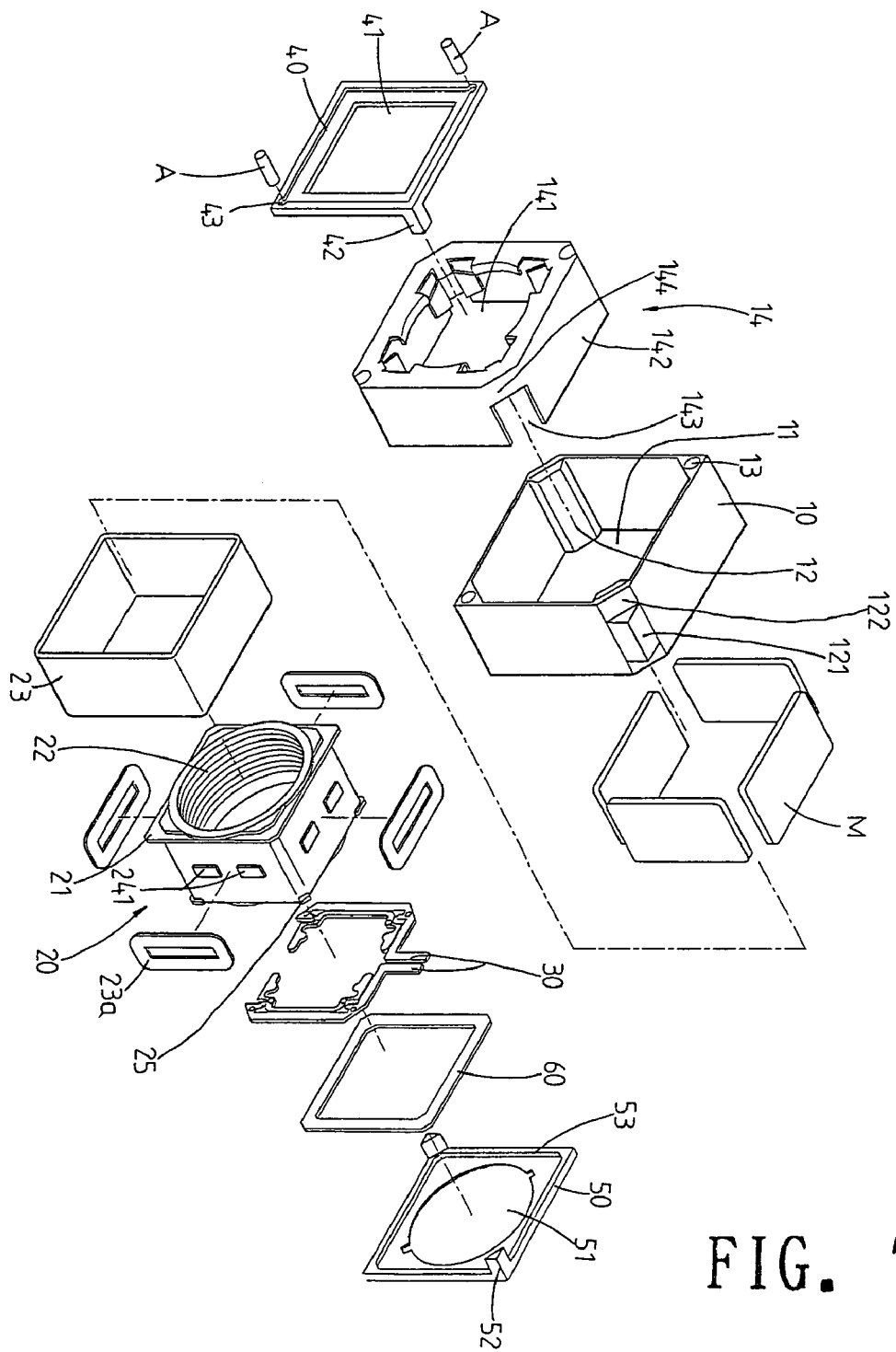
FIG. 7 shows the second embodiment of the high performance focusing actuator of a voice coil motor of the present invention.

Referring to FIG. 7, Another embodiment of the present invention is illustrated, wherein the buckling blocks 241 protrude from the surface of the winding portion 24 of the rectangular cylinder body 21 for combining coils 23 with buckling grooves at centers thereof. This example is also within the scope of the present invention.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A high performance focusing actuator of a voice coil motor comprising;
    a retaining unit including a plastic retaining frame; a center portion of the plastic retaining frame being a receiving space; two opposite corners of the receiving space being chamfered; an inner side of each chamfered side being formed with a slide portion;
    a metal rear cover plate having a shape corresponding to that of the plastic retaining frame; the metal rear cover plate having an open space which is coaxial with the receiving space of the plastic retaining frame; an outer side of the metal rear cover plate having four outer plates; each of two opposite corners of each outer plate being formed with an inclined guide surface corresponding to the slide portion of the plastic retaining frame; one end of the inclined guide surface being formed with a buckling groove for receiving a buckling portion of the plastic retaining frame; an inner side of each corner of the metal rear cover plate being formed with an inner plate for guiding the slide portion of the plastic retaining frame; an iron receiving gap being formed between the inclined guide surface and outer plate; each iron receiving gap receives a magnet.

2. The high performance focusing actuator of a voice coil motor as claimed in claim 1, further comprising;
    a movable unit including a lens assembly and at least one coil enclosing the lens assembly; the lens assembly having a cylinder body at an outer side which is received in the receiving space and a lens cylinder at an interior of the cylinder body for receiving a lens; a cylinder body being formed with a winding portion for receiving the coil; and each corner of a lower end of the cylinder body being a resisting portion.

3. The high performance focusing actuator of a voice coil motor as claimed in claim 1, further comprising;
    two elastic units installed at a rear end of the cylinder body and engaged the resisting portions.

4. The high performance focusing actuator of a voice coil motor as claimed in claim 1, further comprising:
    a casing including a front cover plate and a support plate which are arranged at two ends of the retaining unit.

5. The high performance focusing actuator of a voice coil motor as claimed in claim 4, wherein a center of the rectangular support plate is formed with a rectangular through hole; a rear end of the cylinder body protrudes from the through hole; each of two opposite corners of the support plate corresponding to the slide portions of the plastic retaining frame is extended with a buckling post; the other two opposite corners of the slide portion are formed with two penetrating holes corresponding to the connecting holes of the plastic retaining frame.

6. The high performance focusing actuator of a voice coil motor as claimed in claim 4, wherein an inner side of the front cover plate is formed with a buckling groove; an iron unit is installed between the buckling groove and the elastic unit for sealing the magnet in the iron receiving gap.

7. The high performance focusing actuator of a voice coil motor as claimed in claim 1, wherein an outer side of the chamfered side is formed with a block so as to form a buckling portion; one end of the inclined guide surface is formed with a buckling groove for receiving the buckling portion of the plastic retaining frame.

8. The high performance focusing actuator of a voice coil motor as claimed in claim 1, wherein there are four coils winding the winding portion.

* * * * *